Patented Sept. 7, 1948

2,448,683

UNITED STATES PATENT OFFICE 2,448,683

TITANIUM OXIDE PRODUCTION

James Howard Peterson, Oak Ridge, Tenn., assignor to E. I. du Pont de Nemours & Company, Wilmington, Del., a corporation of Delaware No Drawing. Application February 9, 1944, Serial No. 521,685

7 Claims. (Cl. 23—202)

This invention relates to titanium oxide production and more particularly to a novel process for preparing substantially anhydrous $TiO_2$ which is soft in texture and very fine and uniform in particle size.

More specifically, the invention pertains to the production of anhydrous $TiO_2$ of uniform particle size (ranging from about 0.02 to 0.05 micron in diameter and corresponding to the average particle size of the original colloidal $TiO_2$ dispersion from which it is prepared) said anhydrous product being free of undesired large size particle aggregates and being readily dispersible in organic media.

The preparation of $TiO_2$ from a dried or dehydrated colloidal $TiO_2$ dispersion resulting from the peptization of previously neutralized and purified hydrous $TiO_2$ is already known. It is also well known that the products thus obtained are very hard and gritty, of a glassy appearance, and that when calcined at the usual calcination temperatures (850–950° C.) to develop essential pigment properties, they fail to provide products possessing satisfactory pigment qualities, e. g., the particles of the calcined material are too small to give good pigment properties and are much larger than the particles of the colloid from which they were obtained. As a consequence, these prior products are considered as non-useful in those applications wherein fine texture, uniformly small particle size, softness and friability are requisite and essential.

It has now been found and the present invention broadly embodies the discovery that if the colloidal $TiO_2$ is treated with an alkaline neutralizing agent prior to the colloid drying or calcination treatment and said calcination is effected at certain critical temperatures and in the presence of the reaction product formed from said neutralization treatment, an improved, soft, friable $TiO_2$ product will quite unexpectedly result, the particles of which correspond substantially to the size range of the original colloid.

In a more specific and preferred embodiment, the invention comprises obtaining substantially anhydrous $TiO_2$ in uniform particle size (ranging from 0.02 to 0.05 micron in diameter) by forming a $TiO_2$ colloid through the peptization of hydrous $TiO_2$ with hydrochloric acid, neutralizing said colloid by treatment with ammonium hydroxide, drying the neutralized and coagulated product in the presence of the ammonium chloride formed in the neutralization, and then calcining the dried product at a moderate temperature ranging from about 500 to 650° C.

In one practical and preferred adaptation, hydrous titanium oxide is obtained by precipitation through hydrolysis of a titanium sulfate solution, preferably titanium sulfate. Such precipitation may be effected by any known method, the processes disclosed in U. S. Reissue Patents 18,854 and 18,790 comprising preferred procedures. The metatitanic acid or hydrous $TiO_2$ thus obtained, following washing to remove iron and other metallic impurities present therein, usually contains from about 7–10% sulfuric acid on the $TiO_2$ basis. Prior to colloidally dispersing the same, it must be neutralized, this being readily accomplished through treatment with a suitable basic neutralizing agent, such as ammonium hydroxide or an alkali metal (sodium, potassium, lithium) oxide, hydroxide, or carbonate. After neutralization, the hydrous $TiO_2$ is filtered, washed to remove soluble sulfate ions therefrom, and the resulting purified, sulfate ion-free product is then slurried in water and peptized with a monobasic acid, the total concentration of the latter in the peptized suspension ranging from about .1N to 1.N. Among such acids so usefully employable are hydrochloric, nitric, hydrobromic, perchloric, perbromic or periodic acids. If desired, the slurrying step may be omitted and peptization obtained by simply adding the required amount of acid to the wet filter cake obtained after removal of soluble sulfate ions.

Preferably, hydrochloric acid is used as the peptizing medium, the amount employed being generally equivalent to about 2–10%, on the $TiO_2$ basis, a preferred quantity ranging from about 3–5%. As a rule, peptization is satisfactorily effected by adding the acid to the desulfated hydrous $TiO_2$ precipitate and allowing the mixture to stand overnight at room temperature. It may be desirable, in some instances, to subject the mixture to moderate heat-treatment, e. g., 70° to 100° C., in order to induce the desired aging, maturing, and peptization. Alternatively, the desulfated, hydrous $TiO_2$ precipitate may be slurried, if desired, with varying amounts of water before or during addition of the hydrochloric acid and agitation of the mixture may be resorted to. In some instances this will prove to be very desirable.

From the foregoing steps, a colloidal sol containing up to about 500 g. of $TiO_2$ per liter can be obtained. In actual practice, however, the concentration of the sol is preferably adjusted to from between about 50 and 400 g. of $TiO_2$ per liter. In accordance with this invention, the resulting colloidal dispersion is then suitably treated with an amount of an alkali such as ammonium hydroxide, which will form a salt adapted to volatilize during the subsequent heat treatment, the amount of alkali so used being sufficient to completely neutralize the free acid present in the sol. Alternatively, and if desired, other alkaline agents may be used to effect such neutralization including any of the above-indicated alkali metal hydroxides, oxides, or carbonates. The hydrous $TiO_2$ precipitate is then dried without removal of the salt formed in the neutralization, such drying being effected at ordinary or at elevated temperatures. It is preferred, however, to employ elevated temperatures of the order of from about 100–120° C. for this purpose because of the short time required to effect the drying. Thereafter, the dried product is calcined preferably at a temperature ranging from about 500–650° C. Following calcination, the recovered product may, if desired, be wet ground, which is particularly desirable when optimum texture characteristics in the final product are being sought.

The recovered calcined product will comprise a relatively soft, friable product adapted to be easily broken down when rubbed with glycerin under a spatula on a glass plate, in contradistinction to the definitely harder and difficultly reducible product obtained when a $TiO_2$ colloid is calcined outside the critical temperature ranges herein contemplated. In addition, electron micrographs clearly establish that the particle size of the products of this invention are in the same range of size as in the original aqueous colloid, viz., in the range of from 0.02 to 0.05 micron in diameter. Due to its uniformly small or fine particle size and soft friable form, it can be dispersed readily in organic vehicles and is particularly useful for such purposes as a reinforcement agent in rubber, solvent adsorbent, catalyst, etc.

To a clearer understanding of the invention, the following specific examples are given, each of which is merely illustrative of and not to be construed as in limitation of the invention:

Example I

Titanium hydrate obtained by commercial methods of hydrolysis of titanium sulfate solutions (acid cake) and containing 8 to 10% of sulfuric acid, on the $TiO_2$ basis, is slurried with water and sodium hydroxide is added to the slurry, until all of the acid is neutralized (pH 7), and the hydrous $TiO_2$ freed of sodium sulfate by washing with water. The sulfate-free product is slurried to give a $TiO_2$ concentration of 275 g. per liter. To 11.9 liters of the slurry is added 250 cc. of concentrated HCl (3.35% HCl on the $TiO_2$ basis) to cause peptization of the $TiO_2$. The colloid thus obtained is very stable and is composed of particles having diameters of 0.025 micron, as determined by ultracentrifugal analysis (this analytical procedure is discussed in its various aspects in the following references: Svedberg and Rinde, J. Am. Chem. Soc. 46, 2683 (1924); Nichols and Liebe—Third Colloid Symposium Monograph, 1925, p. 283; Svedberg and Nichols, J. Am. Chem. Soc. 49, 2927 (1927); Svedberg and Heyroth, J. Am. Chem. Soc. 51, 552 (1929); Svedberg, Colloid Chemistry, Special Edition, 1928, pp. 171, etc.).

One portion of the colloid designated "A" is neutralized by addition of dilute ammonium hydroxide to give a slurry having a pH of 7 to 7.2. The neutral product is dried at 110° C. without washing and the dried product is calcined at 600° C. for 30 minutes. The calcined product is essentially pure $TiO_2$ in a soft friable form which can be dispersed readily in organic vehicles. The individual particles are about the same size as the particles in the aqueous HCl sol, i. e., about 0.025 micron in diameter. They are readily discernible as discrete particles under the magnification attainable by means of the electron microscope.

A second portion of the hydrochloric acid peptized colloid designated "B" is dried without addition of ammonium hydroxide. The product is hard, of glossy appearance, and is difficultly dispersible in organic vehicles. When the dried product is calcined at 600° C. it yields a material which is harder and more difficult to disperse in organic vehicles than that prepared above.

Example II

Titanium sulfate is hydrolyzed by the following procedure to give hydrous titanium oxide (acid cake):

Two thousand two hundred twenty cc. of a titanium sulfate solution containing 180 gr. of $TiO_2$/liter is added during a period of five minutes to 1780 cc. of water heated at 92° C. The resulting nucleated solution is boiled for 3 hours, at a $TiO_2$ concentration of 100 gr./liter and the precipitate is washed to remove iron and other impurities. The resulting washed filter cake is slurried as in Example I. The slurry is neutralized with ammonium hydroxide and the precipitate filtered and washed to remove soluble sulfate ions. The neutral suspension of $TiO_2$ is peptized by addition of hydrochloric acid to give a colloid containing 5.7% HCl on the $TiO_2$ basis. The colloid is neutralized to a pH of 7–7.2 by addition of ammonium hydroxide, the resulting neutral suspension dried at 110° C., and calcined at 600° C. without first removing the ammonium chloride. The calcined product is wet-ground in a pebble mill and the product filtered and dried. The dried powder is used as a reinforcing agent in a natural rubber composition, substituting on an equal volume basis in a standard formula. The tensile strength of the resulting rubber compound, after vulcanization at 134° C. for 30 minutes, is about 1600 lbs./sq. in.

When the calcined product prepared in the bulk is dispersed in an organic vehicle, such as a lithograph varnish, electron microscope determinations indicate an average particle size of 0.025 to 0.03 micron in diameter which substantially corresponds to the range of size exhibited by the colloid from which the product is obtained.

While above illustrated as applied to certain preferred embodiments, the invention is obviously not limited thereto. For instance, while metatitanic acid has been disclosed as one form of useful $TiO_2$ hydrate from which the colloidal sol may be obtained, other forms of hydrous $TiO_2$ may be utilized herein, including orthotitanic acid produced by neutralizing a relatively pure solution of a titanium salt, such as the chloride, nitrate or sulfate. Thus, a titanium salt solution, preferably the sulfate, can be neutralized at room temperature with a solution of an alkali such as sodium, ammonium, potassium or lithium hydroxides, oxides or carbonates, in order to precipitate the orthotanic acid. In this alternative method, the hydrous $TiO_2$ is also subjected to purification to remove all sulfate ions, this being accomplished by washing with water in a conventional manner and then slurrying the purified product in water, preferably at a concentration of about 35 g. $TiO_2$ per liter. Thereafter, the $TiO_2$ is peptized by treatment with a monobasic acid, preferably hydrochloric or nitric acids, the amount of acid so used being preferably sufficient to provide a concentration of about 0.3 N. The resulting mixture is then subjected to heat treatment, preferably at a temperature of about 80° C., for a period of about 20 minutes, which results in the desired peptization.

Again, while specific temperatures and heating periods have been set forth above, for aging or conditioning the hydrous TiO₂ in the peptizing monobasic acid medium, said temperatures and times are variable and will depend somewhat upon the concentration of acid and TiO₂ present in the mixture to be peptized. A preferred conveniently useful temperature range comprises one from about 50° C. to about 90° C., while the time utilized may vary from about 5 minutes to about 3 hours, depending upon the temperature and concentration of the suspension under treatment. In most instances where a relatively lower temperature, say, of the order of the lower portion of the given range, is employed, longer aging periods will be found to be more desirable, whereas with higher temperatures relatively shorter conditioning periods will be required.

The use of relatively pure titanium salt solutions in producing the hydrous TiO₂ by the indicated neutralization process, and particularly of the fluoride, chloride or sulfate is especially advantageous. Titanium fluoride readily lends itself to purification through removal of heavy metal ions, due to the fact that such solutions can be neutralized to a pH of about 6.6 before precipitation of the hydrous TiO₂ begins. The concentration of the colloidally-dispersed TiO₂ may vary over a relatively wide range and, if desired, the proportions of water hydrate and peptizing agent can be varied so that the resulting sol will contain between about 5 g. to about 50 g. of TiO₂ per liter.

Again, while temperatures ranging from about 500° C.–650° C. provide optimum results under the invention and hence are indicated as preferred for calcining the TiO₂ colloid in the presence of the soluble salt formed upon colloid neutralization, other temperatures, especially those ranging from about 300° C. to about 700° C., can also be utilized. It will be found critical and essential to the invention, however, that the latter range of temperature not be exceeded. As the examples demonstrate, the calcination must be effected in the presence of the salt formed as a result of neutralizing the colloid, and unless temperatures below 300° C. and above 700° C. are resorted to, the beneficial results of the invention will not obtain. Hence, to avoid obtaining the prior art type of hard, glossy product containing large, irregularly-shaped aggregates with a particle size greater than that of the particles in the original colloid from whence the TiO₂ is derived, one must observe the specified, critical temperature ranges.

Although in Example II the use of the TiO₂ of this invention as a semi-reinforcing filler for natural rubber has been illustrated, it is to be understood that this TiO₂ may also be used similarly with synthetic rubbers such as chloroprene polymers and interpolymers, polybutadiene, polyisoprene, polydimethylbutadiene and interpolymers of diene hydrocarbons with monovinyl or vinylidene compounds such as styrene, acrylonitrile, methacrylic esters, isobutylene or vinylethinyl carbinols. For example, a vulcanizate of a 75:25 butadiene/styrene copolymer known as GR-S prepared in the usual manner and filled with 25 volume per cent of colloidal titanium oxide shows a tensile strength of 1260 lbs./in.² at 535% break elongation. The vulcanizates possess excellent electrical properties, having greater direct current resistivity than corresponding vulcanizates filled with a semi-reinforcing carbon black.

I claim as my invention:

1. A process for obtaining small particle size, soft-textured, friable, anhydrous TiO₂ having an average particle size corresponding to the colloidal TiO₂ from which it is prepared, which comprises neutralizing a peptized colloidal TiO₂ dispersion free from extender particles, by means of an alkaline reagent, and then calcining the coagulated TiO₂ product at a temperature ranging from 300–700° C., in the presence of the salt formed by reaction between the alkaline agent and the peptizing agent in said colloidal dispersion.

2. A process for obtaining small particle size, soft-textured, friable, anhydrous TiO₂ having an average particle size corresponding to the colloidal TiO₂ from which it is prepared, which comprises neutralizing a peptized colloidal TiO₂ dispersion free from extender particles by means of an alkaline reagent, and then calcining the coagulated TiO₂ product at a temperature ranging from about 500–650° C., in the presence of the salt formed by reaction between the alkaline agent and the peptizing agent in said colloidal dispersion.

3. A process for obtaining small particle size, soft-textured, friable, anhydrous TiO₂ having an average particle size corresponding to the colloidal TiO₂ from which it is prepared, adapted to be readily dispersed in organic media which comprises dispersing precipitated hydrous TiO₂ free from extender particles in a monobasic acid, neutralizing the resulting peptized TiO₂ sol free from extender particles by means of an alkaline reagent, and then drying and calcining the coagulated extender-free TiO₂ product at a temperature ranging from 300–700° C. in the presence of the salt formed by reaction between the alkaline agent and the peptizing agent in said colloidal dispersion.

4. A process for obtaining small particle size, soft-textured, friable, anhydrous TiO₂ having an average particle size corresponding to the colloidal TiO₂ from which it is prepared adapted to be readily dispersed in organic media which comprises dispersing precipitated hydrous TiO₂ free from extender particles in hydrochloric acid, neutralizing the resulting peptized TiO₂ sol free from extender particles by means of an alkaline reagent, and then drying and calcining the coagulated extender-free TiO₂ product at a temperature ranging from 300–700° C. in the presence of the salt formed by reaction between the alkaline agent and the peptizing agent in said colloidal dispersion.

5. A process for obtaining small particle size, soft-textured, friable, anhydrous TiO₂ having an average particle size corresponding to the colloidal TiO₂ from which it is prepared adapted for ready dispersion in organic media which comprises forming a peptized colloidal sol free from extender particles by dispersing precipitated TiO₂ in hydrochloric acid, neutralizing the resulting TiO₂ colloid free from extender particles by adding thereto a sufficient quantity of ammonium hydroxide, and then drying and calcining the coagulated extender-free TiO₂ product at a temperature ranging from about 500–700° C. in the presence of the ammonium chloride reaction product formed by reaction of the ammonium hydroxide with said hydrochloric acid in the dispersion.

6. A process for obtaining organic-media-dispersible, soft-textured, friable, anhydrous TiO₂ having an average particle size of from about 0.02 to 0.05 micron in diameter corresponding to the average particle size of the colloidal TiO₂ dispersion from which it is prepared, which comprises forming a colloidal TiO$_2$ dispersion free from extender particles by precipitating hydrous TiO$_2$ from a titanium salt solution, purifying the resulting precipitate, and peptizing the purified, extender-free product in the presence of a monobasic acid at a concentration ranging from about .1 N. to 1 N., neutralizing the resulting TiO$_2$ colloid free from extender particles by mixing a sufficient quantity of an alkali therewith, and then drying and calcining the coagulated extender-free TiO$_2$ product at a temperature ranging from 300–700° C., in the presence of the salt formed by reaction between the alkaline agent and the peptizing agent in said colloidal dispersion.

7. A process for obtaining organic-media-dispersible, soft-textured, friable, anhydrous TiO$_2$ having an average particle size of from about 0.02 to 0.05 micron in diameter corresponding to the average particle size of the colloidal TiO$_2$ dispersion from which it is prepared, which comprises forming a colloidal TiO$_2$ dispersion free from extender particles by precipitating hydrous TiO$_2$ from a titanium salt solution, purifying the resulting precipitate, and peptizing the purified, extender-free product with an amount of hydrochloric acid equivalent to from about 2–10%, on the TiO$_2$ basis, subjecting the resulting mixture to heat treatment at a temperature ranging from about 50–90° C., for a period of about 15–20 minutes, neutralizing the resulting TiO$_2$ colloid free from extender particles by incorporating therein a sufficient quantity of ammonium hydroxide, drying the neutralized and coagulated extender-free TiO$_2$ product in the presence of the ammonium chloride reaction product formed by reaction of said hydroxide with the hydrochloric acid in the dispersion, and then calcining the dried product at a temperature ranging from about 500–650° C.

JAMES HOWARD PETERSON.

REFERENCES CITED

The following references are of record in the file of this patent:

UNITED STATES PATENTS

| Number | Name | Date |
| --- | --- | --- |
| 1,766,592 | Blumenfeld | June 24, 1930 |
| 2,220,966 | Krchma | Nov. 12, 1940 |